(12) United States Patent
Zorba Barah et al.

(10) Patent No.: US 8,208,952 B2
(45) Date of Patent: Jun. 26, 2012

(54) POWER ALLOCATION METHOD IN MULTIANTENNA SYSTEMS UNDER PARTIAL CHANNEL KNOWLEDGE

(75) Inventors: Nizar Zorba Barah, Castelldelfels (ES); Ana Isabel Perez Neira, Castelldefels (ES)

(73) Assignee: Fundacio Privada Centre Tecnologic de Telecomunicacions de Catalunya, Castelldefels (Barcelona) (ES)

( * ) Notice: Subject to any disclaimer, the term of this patent is extended or adjusted under 35 U.S.C. 154(b) by 379 days.

(21) Appl. No.: 12/666,160

(22) PCT Filed: Jun. 28, 2007

(86) PCT No.: PCT/EP2007/056491
§ 371 (c)(1),
(2), (4) Date: Dec. 22, 2009

(87) PCT Pub. No.: WO2009/000329
PCT Pub. Date: Dec. 31, 2008

(65) Prior Publication Data
US 2010/0182967 A1    Jul. 22, 2010

(30) Foreign Application Priority Data
Jun. 22, 2007    (ES) .................... 200701742

(51) Int. Cl.
*H04Q 7/20*    (2006.01)
(52) U.S. Cl. ......... 455/522; 455/69; 455/67.11; 455/68; 455/509; 455/426.1; 370/328; 370/329; 370/330; 370/337; 370/345

(58) Field of Classification Search .................. 455/522, 455/69, 127.1, 500, 517, 509, 445, 507, 561, 455/67.11, 511, 515, 422.1, 403, 552.1, 553.1, 455/575.1, 526, 423–425, 68, 426.1, 426.2; 370/328, 329, 330, 336, 337, 338, 343, 345
See application file for complete search history.

(56) References Cited

U.S. PATENT DOCUMENTS
2007/0042717 A1* 2/2007 Alexiou et al. .................. 455/69
2007/0135139 A1* 6/2007 Avidor et al. .............. 455/456.5

OTHER PUBLICATIONS

Boyd, et al., Convex Optimization Problems, 2004, pp. 136-152, Cambridge University Press, US.

(Continued)

*Primary Examiner* — Keith Ferguson
(74) *Attorney, Agent, or Firm* — Katten Muchin Rosenman LLP (57) ABSTRACT

Method for allocating a minimum downlink power from a transmitter (1) having nt transmit antennas of a cellular multi-user multi-antenna communications system with N users attached to said transmitter (1). Each user comprises at least one antenna. The method comprising the steps of: generating at said transmitter (1) M random beams (b1 ... bM); sending said M random beams through all the transmit antennas; calculating at each user a signal-to-noise-interference-ratio for each random beam sent by said transmitter (1); sending back to said transmitter (1) said calculated values of signal-to-noise-interference-ratio, said signal-to-noise-interference-ratio representing a partial channel state information; selecting at said transmitter (1) the M best users which correspond to the M best values of signal-to-noise-interference-ratio per beam.

14 Claims, 8 Drawing Sheets

OTHER PUBLICATIONS

Pascual-Iserte, et al., "A Maximin Approach for Robust Mimo Designs: Combining OSTBC and Beamforming with Minimum Transmission Power Requirements", Acoustics, Speech, and Signal Processing, vol. 2, May 17, 2004, Proceedings. (ICASSP ' 04). IEEE International Conference on Montreal, Quebec, Canada, Piscataway, NJ US.

Sharif, et al., "On the Capacity of MIMO Broadcasts Channels with Partial Side Information", IEEE Transactions on Information Theory, Feb. 2005, pp. 506-522, vol. 51, Piscataway, NJ, US.

Schubert, et al., "Solution of the Multiuser Downlink Beamforming Problem with Individual SINR Constraints", Jan. 2004, vol. 53, pp. 18-28, IEEE Transactions on Vehicular Technology.

Spencer, et al., "Capacity and Downlink Transmissions Algorithims for a Multi-user MIMO Channel", Conference Record of the 36th. Asilomar Conference on Signals, Systems, & Computers. Nov. 3-6, 2002 vol. 1 of 2 pp. 1384-1388, IEEE, New York, NY, US.

International Search Report dated Feb. 14, 2008 for corresponding International Application No. PCT/EP2007/056491.

* cited by examiner

POWER ALLOCATION METHOD IN MULTIANTENNA SYSTEMS UNDER PARTIAL CHANNEL KNOWLEDGE

FIELD OF THE INVENTION

The present invention relates to a method for power allocation and more precisely, for power allocation under quality of service constraints and partial channel knowledge.

STATE OF THE ART

The Multiple-Input-Multiple-Output (MIMO) Multiuser technology outstands as one of the major techniques to improve the performance of the wireless communications, being recently proposed for IEEE 802.11n, IEEE 802.16e and UMTS-HSDPA. This technology provides large data rate while using the same amount of spectrum and power, thanks to its spatial multiplexing capabilities.

Unlike the Point-to-Point scenario where the Channel State Information at the Transmitter (CSIT) side is not crucial, the Multiuser system heavily depends on the amount of CSIT. However, the feedback load from each one of the users to the transmitter in a downlink scenario incurs in a great efficiency loss in the system resources, making the full channel knowledge in multiuser MIMO systems to be very unlikely to happen in real communication systems.

Motivated by the impossibility of full CSIT, multiuser MIMO transmission strategies that relay on partial channel knowledge are required for their realistic implementation in commercial transmission schemes. Among them and all the MIMO multiuser schemes, the Multibeam Opportunistic Beamforming strategies are attractive due to their high performance and multiplexing capabilities, while at the same time low complexity design, where only partial CSIT in terms of the channel modulo is required for the system proper performance. Its maximal sum rate has been analyzed through the theoretical studies in literature as in M. Sharif and B. Hassibi, "On the Capacity of MIMO Broadcast Channel with Partial Side Information," *IEEE Transactions on Information Theory*, vol. 51, no. 2, pp. 506-522, February 2005.

However, for their commercial system implementation where an approach that focuses on the Quality of Service (QoS) of the served users is required, further considerations are needed. The QoS of the system can potentially be measured through the minimum rate per user, so that each served user is guaranteed a minimum Signal-to-Noise-Interference-Ratio (SNIR), allowing it to properly decode its intended data with a predefined Packet Error Rate (PER).

Regarding the minimum rate requirement per user, the user satisfaction is shown to be insignificantly increased by a service rate higher than the user demands, while on the other hand, if the provided rate fails below its requirement, the satisfaction drastically decreases. Therefore, a commercially attractive transmission scheme is accomplished by meeting the minimum rate requirement for each scheduled user while minimizing the total transmitted power.

Several Multiuser MIMO studies have considered the minimum power transmission with QoS demands when full CSIT is available, as presented in M. Schubert and H. Boche, "Solution of the Multiuser Downlink Beamforming Problem with Individual SINR Constraints," *IEEE Transactions on Vehicular Technology*, vol. 53, no. 1, pp. 18-28, January 2004. However, when moving to realistic system with partial CSIT, no previous contributions have been made in the multibeam opportunistic beamforming schemes, where the achievement of QoS minimum rate is difficult and stands as an open issue both in literature and technology transfer. This is mainly due to the cross interference terms that the multibeam opportunistic beamforming originates in the multiuser scenario as each user receives an interference component from each one of the generated beams, while only partial CSIT is available at the scheduler, so that no pre-processing can be carried at the transmitter side to combat the cross interference terms.

This task is even more difficult in practical wireless scenarios as the CSIT information is not perfect due to fast fading, quantization, limited duration of the training step and/or non-accurate estimation during the training process, so that the scheduler has to deal not only with partial CSIT, but also has to take into consideration that the available partial CSIT measures are imperfect.

SUMMARY OF THE INVENTION

It is a primary aim of the present invention to provide a power allocation method that requires a minimum power to guarantee the QoS minimum rate for each one of the scheduled users having a partial CSIT scenario (only the channel modulo information is available at the transmitter).

In particular, it is an object of the present invention a method for allocating a minimum downlink power from a transmitter of a cellular multi-user multi-antenna communications system with N users attached to the transmitter. The transmitter (1) comprises $n_t$ transmit antennas and each of the N users comprises at least one antenna. The method comprising the steps of, at a certain time instant t: generating at the transmitter a plurality of M random beams; sending each one of the M random beams through all the $n_t$ transmit antennas; calculating at each one of said N users a signal-to-noise-interference-ratio for each one of the M random beams sent by the transmitter; sending back to the transmitter the calculated values of signal-to-noise-interference-ratio, which represent a partial channel state information; selecting at the transmitter the M best users which correspond to the M best values of signal-to-noise-interference-ratio per beam; assuming at the transmitter (1) that there exists uncertainty in the partial channel state information. The method further comprises the steps of: allocating a minimum amount of power to the M beams, that minimum amount of power being dependent on the best values of signal-to-noise-interference-ratio per beam, on a predetermined quality of service requirement per user and on a predefined allowed outage in the quality of service requirement per user. The power allocation is robust to the assumed uncertainty in the partial channel state information.

In a particular embodiment, the selection of best values of signal-to-noise-interference-ratio is performed over the instantaneous signal-to-noise-interference-ratio fed back measures.

In a particular embodiment, that predefined allowed outage in the quality of service requirement per user is zero. Due to that uncertainty in the partial channel state information at the transmitter, a worst case scenario is chosen in order to guarantee the fulfilment of the quality of service requirement while allocating the minimum amount of power.

The M values of allocated power which minimize the total transmitted power from the transmitter are preferably obtained by solving a convex optimization problem that is explained later on.

In another particular embodiment, the predefined allowed outage in the quality of service requirement per user is greater than zero.

In that case, due to the uncertainty in the partial channel state information at the transmitter, a statistical scenario is chosen in order to guarantee the fulfilment of the quality of service requirement while allocating the minimum amount of power.

Also in that case, wherein due to the uncertainty in the partial channel state information at the transmitter, a scheme based on the probability of outage in the users' quality of service is followed in order to guarantee the fulfilment of the quality of service requirement per user while allocating the minimum amount of power.

The allocated power which minimizes the total transmitted power from the transmitter then follows a uniform power distribution applicable to all transmit beams. That uniform power distribution is explained later on.

Finally, the method further comprises the step of transmitting from the transmitter the allocated power to the selected M users through the $n_t$ transmit antennas.

It is another object of the present invention to provide a transmitter comprising means adapted for carrying out the steps of the previous method.

A base station which comprises at least a transmitter as previously indicated is also provided.

A mobile communications system which comprises at least a base station as mentioned above is also provided.

Finally, it is a further object of the present invention to provide a computer program comprising computer program code means adapted to perform the steps of the mentioned method when the program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED
EMBODIMENTS OF THE INVENTION

Definitions

In the context of the present invention, the term "uncertainty" refers to the state of being unsure of a measure. As a matter of example, the uncertainty in a signal-to-noise-interference-ratio (SNIR) at a transmitter refers to the doubts about the accuracy of that SNIR value that said transmitter has.

In the context of the present invention, the term "quality of service" refers to the satisfaction of a predefined level of transmission rate.

In the context of the present invention, the term "robust" applied to a transmitter means that the transmitter can achieve its quality-of-service (QoS) regardless of the scenario uncertainties, so that, even if the transmitter input CSIT is not exact, a correct output performance is guaranteed.

In the context of the present invention, the term "partial" applied to the channel information of a wireless system means that not the whole channel information (modulo and phase) is available at the transmitter side, but only the modulo part is known by the transmitter.

In this text, the term "comprises" and its derivations (such as "comprising", etc.) should not be understood in an excluding sense, that is, these terms should not be interpreted as excluding the possibility that what is described and defined may include further elements, steps, etc.

Finally, the following operators are used: The operator $(')^H$ denotes hermitian transposition; and "Tr" or "trace" is the sum of the values of the diagonal of a matrix.

Figure 1:
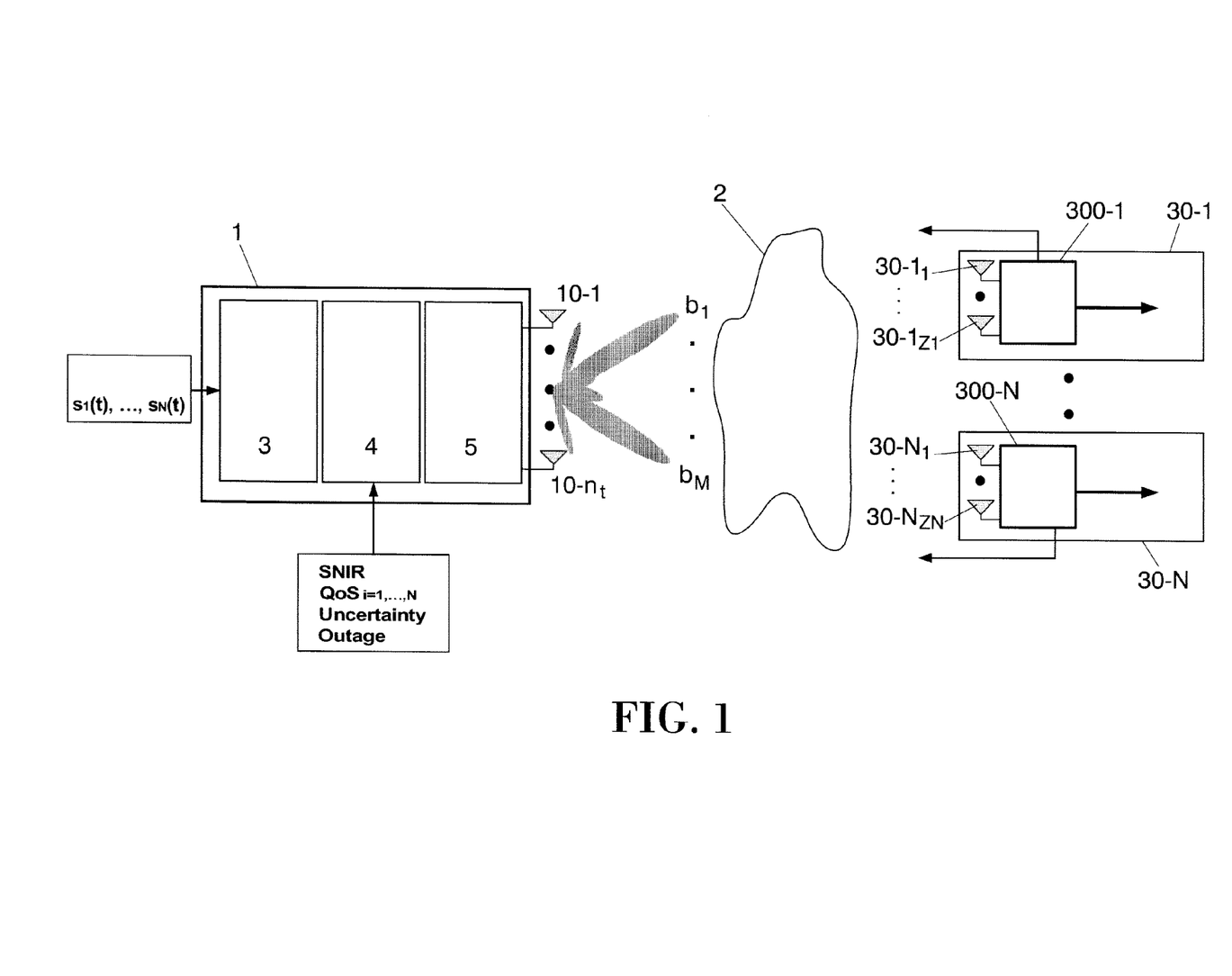
FIG. 1 shows a block diagram of a wireless system for carrying out the method of the present invention.

FIG. 1 is a schematic representation of the system and power allocation scheme of the invention. FIG. 1 shows a mobile or wireless network which comprises a plurality of base stations, each of them comprising one or more transmitters. For simplification purposes, FIG. 1 illustrates a single base station having a single transmitter, but the invention is not limited to this simplified illustration. FIG. 1 illustrates a transmitter 1 comprising $n_t$ transmitting antennas 10-1 10-2 ... 10-$n_t$. FIG. 1 also shows N mobile terminals, receivers or users 30-1 30-2 ... 30-N attached to said transmitter 1. Each one of said N mobile terminals, receivers or users is equipped with a single or multiple receiving antennas 30-1$_1$ ... 30-1$_{Z1}$ 30-2$_1$ ... 30-2$_{Z2}$ ... 30-N$_1$ ... 30-N$_{ZN}$. Reference 2 represents a Multiuser MIMO channel through which information between the transmitter 1 and the N mobile terminals, receivers or users 30-1 30-2 ... 30-N is exchanged. It is supposed that N is greater than $n_t$. From now on, the term "users" will be used to refer to the N mobile terminals, receivers or users 30-1 30-2 ... 30-N.

Although each of the N users can have a single or several receiving antennas 30-1$_1$ ... 30-1$_{Z1}$ 30-2$_1$ ... 30-2$_{Z2}$ ... 30-N$_1$ ... 30-N$_{ZN}$, as illustrated in FIG. 1, for the sake of simplicity, the mathematical presentation is done with a single antenna per user.

Each of the N users 30-1 30-2 ... 30-N comprises a calculation unit 300-1 300-2 ... 300-N, capable of carrying out pre-data SNIR calculations, the results of which are taken to respective data processing units, not shown.

A multiantenna channel $h_{[1 \times nt]}$ is considered between each of the N users and the transmitter 1. This multiantenna channel can be represented by a vector $h_{[1 \times nt]}$ (having $n_t$ elements). Through the channel 2, a quasi static block fading model is assumed which keeps constant through the coherence time, and independently changes between consecutive time intervals with independent and identically distributed (i.i.d.) complex Gaussian entries, with zero mean and unit variance.

Let x(t) be the $n_t \times 1$ transmitted vector (by the $n_t$ transmit antennas), while $y_i(t)$ denotes the $i^{th}$ user received signal given by $$y_i(t) = h_i(t) + z_i(t)$$

where $z_i(t)$ is an additive complex noise component with zero mean and variance $E\{|z_i(t)|^2\}=\sigma^2$. For ease of notation, from now on time index t is dropped, thus having $$y_i = h_i x + z_i \quad (1),$$

and $E\{|z_i|^2\}=\sigma^2$.

Among the N users in the system, the transmitter 1 delivers service to M simultaneous users (M≦N) through the generation of M random beams b1 b2 ... $b_M$. Each generated beam is transmitted over the $n_t$ transmitting antennas 10-1 10-2 ... 10-$n_t$. The maximum number of served users M is $n_t$. Alternatively, and depending on the circumstances, it can be desirable to serve M users, M<$n_t$. The minimum number of served users is 2 (M>1). Therefore a more compact formulation is obtained by stacking the received signals and the noise components of the set of M selected users as y=Hx+z, with H=[h1; ... ; $h_M$] as the compound channel. It must be noticed that the transmitted signal x encloses the uncorrelated data symbols $s_i$ to each one of the M selected users with $E\{|s_i|^2\}=1$. FIG. 1 also shows these uncorrelated data symbols $s_i$ (which are dependent of the time instant t: $s_i(t)$).

The transmission technique used in this multiuser scenario is the multibeam opportunistic beamforming, where a plurality M of random beams is generated at the base station to simultaneously serve more than one user. Within the acquisition step, each one of the N users 30-1 30-2 ... 30-N sequentially calculates at the calculation unit 300-1 300-2 ... 300-N the signal-to-noise-interference ratio (SNIR) that it receives from each of the M beams, and feeds back these values to the base station comprising the transmitter 1. This scheme saves around 50% of the full Channel State Information at the Transmitter (CSIT) feedback load, because this multibeam opportunistic scheme only requires for channel modulo information.

The base station comprises a scheduling unit 3, which chooses the user 30-1 30-2 ... 30-N with the largest SNIR value for each one of the M beams, enters a transmission stage and forwards the set of M selected users with their intended data. This is done as follows: At the scheduling unit 3, the N SNIR values (due to the first beam b1) coming from the N users are compared. The scheduling unit 3 selects the user which has best SNIR. Then that user is already chosen for transmission, in such a way that it is eliminated from the remaining group of potential users, in order not to select twice the same user (in the improbable event that the same user has best SNIR values for two different "training" transmitted beams bi bj). The base station also comprises a power loading unit 4, in charge of allocating the required power to each of the M beams. As will be explained later, power is allocated at the power loading unit 4 from the SNIR information, the quality-of-service requirements and the allowed outage in the QoS per user. It also comprises a beamforming unit 5, which generates orthonormal random beams.

This multibeam strategy achieves high system sum rate by serving several users at the same time, making the transmitted signal to enclose the data symbols for the M selected users as $$x = \sum_{m=1}^{M} x_m = \sum_{m=1}^{M} b_m p_m^{1/2} s_m = BP^{1/2} s \quad (2)$$

wherein $b_m$ is the beam assigned to the $m^{th}$ user and $p_m$ is the assigned power to that beam. The matrix $B=[b_1, \ldots, b_M]$ is randomly generated in unit 5, following an orthonormal policy to produce the lowest possible interference among the served users, while $P^{1/2}$ is a diagonal matrix with $p_m^{1/2}$ as its diagonal entries.

This formulation (2) is a more detailed version of equation (1), as a power allocation P over the M transmitted beams (2≦M<$n_t$) is incorporated thanks to the feedback load of the transmission scheme.

The system sum rate (SR) capacity of this multibeam opportunistic beamforming can be written as:

$$SR \approx E\left\{\sum_{m=1}^{M} \log\left(1 + \max_{1 \leq i \leq N} SNIR_{i,m}\right)\right\} \quad (3)$$

wherein $SNIR_{i,m}$ is the SNIR term due to the interference that each beam generates to its non-intended users, representing a major drawback of the mentioned scheme.

The SNIR formulation for the $i^{th}$ user through the $m^{th}$ beam, with several transmitting orthogonal beams, is:

$$SNIR_{i,m} = \frac{p_m|h_i b_m|^2}{\sigma^2 + \sum_{u \neq m}^{M} p_u |h_i b_u|^2} = \frac{p_m|c_{i,m}|^2}{\sigma^2 + \sum_{u \neq m}^{M} p_u |d_{i,u}|^2} \quad (4)$$

where $c_{i,m}=h_i b_m$ and $d_{i,u}=h_i b_{u \neq m}$ denote the equivalent channel seen by the $i^{th}$ user or receiver with respect to each one of the M generated beams (2≦M<$n_t$). The scheduling unit 3 of the base station receives M SNIR values from each one of the N users (that is to say, it receives, in total, M×N SNIR values), so that for each one of the scheduled users, the base station (scheduling unit 3) can calculate the values of $|c_{i,m}|$ and $|d_{i,u}|$ from direct matrix algebra calculations with M unknown quantities within M equations. As each user only feeds back its SNIR measures, then at least a 50% feedback reduction is achieved in comparison to the full CSIT case where the whole channel (both modulo and phase) has to be fed back to the scheduling unit.

Each scheduled user requires a quality of service (QoS) minimum rate to detect and manage its received signal. This is easily accomplished when a single user is scheduled at a time, so that through the power control, the delivered rate is regulated to the user requirements. However, when several simultaneous users are scheduled through a multibeam opportunistic beamforming, with cross interference terms among them as shown in equation (4), then this task is not a trivial one.

This QoS objective is formulated through a minimization of the total transmitted power ($P_t$) over all possible power loading matrices (P), while the QoS minimum rate requirements are presented by minimum SNIR per user restrictions ($snir^{th}$) as follows $$\min_{P} P_t \quad (5)$$

$$\text{s.t.} \quad SNIR_{i,m}(P) - snir_i^{th} \geq 0$$

$$\forall i, m$$

This formulation is widely used in literature and technology progress as it is very attractive for commercial implementation to reduce inter-cells interference, while satisfying the QoS for the serviced users in the cell.

However, the goal of the invention is the achievement of the minimum power to satisfy the QoS rate requirements in a partial CSIT Multiuser MIMO scenario where imperfect measures are available at the transmitter 1 side.

The total transmitted power for the multibeam opportunistic beamforming scheme is expressed as: $P_t = Tr(BPB^H) = Tr(P)$ because of the random orthonormal transmitter processing matrix B, so that together with the consideration of the SNIR expression, it makes the previous optimization problem to particularize for the multibeam opportunistic case as $$\min_P Tr(P) \quad (6)$$

$$\text{s.t.} \quad p_m |c_{i,m}|^2 - snir_i^{th} \left[ \sigma^2 + \sum_{u \neq m}^{M} p_u |d_{i,u}|^2 \right] \geq 0$$

$$\forall i, m$$

that stands as a convex optimization problem that is numerically solved through any convex optimization tool like the ones presented in the book of "Convex Optimization", S. Boyd and L. Vandenberghe, Cambridge University Press, 2004.

The SNIR constraints must be satisfied for all the selected users, where the set of loading matrices P which satisfy these constraints are called the problem feasibility region $S^P$, that depends on the equivalent channels (HB) of the selected users and on the required SNIR values $snir^{th}$ for each one of them as:

$$S^P(HB, snir_i^{th}) = \quad (7)$$

$$\left\{ P \in \Omega \mid p_m |c_{i,m}|^2 - snir_i^{th} \left[ \sigma^2 + \sum_{u \neq m}^{M} p_u |d_{i,u}|^2 \right] \geq 0 \ \forall i, m \right\}$$

with $\Omega$ as the set of all diagonal and positive definite M×M matrices.

The feasibility region is an important characterization for the multibeam opportunistic schemes, as not all the required sets of $snir^{th}$ can be achieved by the system due to the cross interference terms among the served users.

Nevertheless, in practical wireless scenarios, the channel information (i.e. SNIR) available at the transmitter 1 is not perfect due to fast fading, quantization, limited duration of the training step and/or non-accurate estimation.

Next a design of a multibeam opportunistic beamforming scheme that not only requires for partial CSIT, but is also robust to uncertainty in the already partial information available at the transmitter 1, is described. The general scheme is the one represented in FIG. 2, wherein block 40 represents the step in which a transmitter 1 generates $n_t$ (or M in a more general case, with $2 \leq M < n_t$, if only M users ($2 \leq M < n_t$) are going to be served) orthonormal random beams. Next, they are sequentially transmitted through the wireless channel 2 (step 41). Then, each user sequentially measures its equivalent channel norm (step 42). Next, each user calculates the SNIR values and feeds them back to the transmitter 1 (step 43). There, the scheduling unit 3 selects the best M users for transmission (step 44). Next, taking into account that there exists uncertainty in the partial channel state information, the power loading unit 4 performs a robust power allocation calculation from said SNIR of selected users, the required QoS per user and an allowed outage in the QoS per user (step 45). If the allowed outage is 0, in other words, if the previously defined level of QoS (in terms, for example, of a previously defined bit rate) can never be under that level, then a worst case design is chosen (step 45-A) (scheme A as will be explained next). If the allowed outage is >0, in other words, if there is a percentage of situations wherein the level of QoS can be under the required level, then a statistical design or robust probability of outage design is chosen (step 45-B) (scheme B as will be explained next). Once the power allocation scheme is carried out (A or B), each user's symbol is loaded with its calculated power (step 46). Afterwards, transmission to the selected users begin (step 47). Finally, when transmission period ends (step 48), a new set of M orthonormal random beams is generated (back to step 40).

Figure 2:
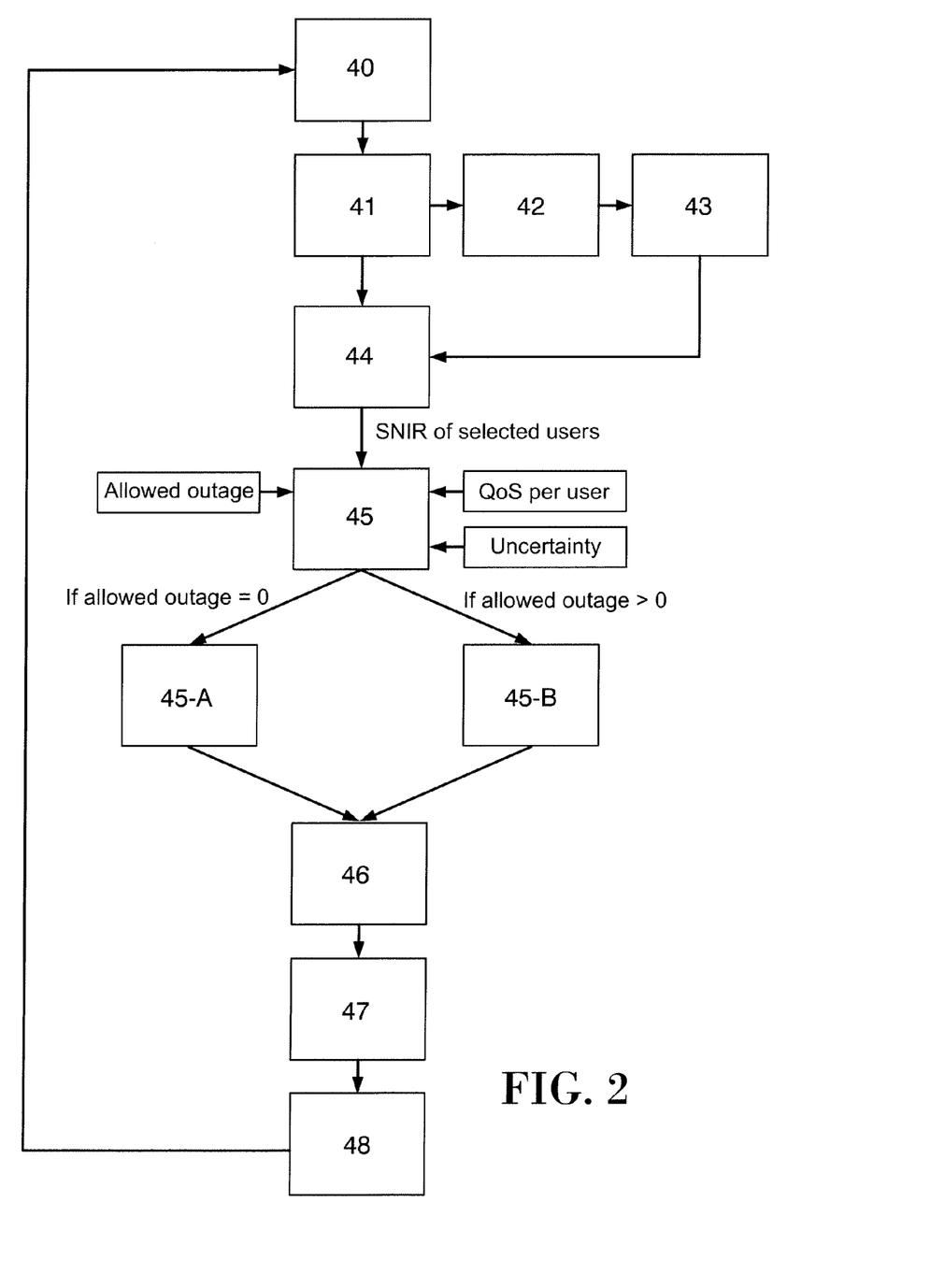
FIG. 2 shows a flowchart of the method according to the present invention.

Next, two alternative, practical power allocation designs are presented, corresponding to respective steps 45-A and 45-B of FIG. 2. They are robust to the uncertainty in the partial CSIT information. These robust power allocation methods are designed to minimize the total transmitted power, while meeting the minimum SNIR requirements.

A—Worst Case Design

A worst case scenario represents a situation in which a minimum rate for absolutely all cases is guaranteed.

Therefore, the outage in the minimum rate satisfaction is fixed to 0. In multibeam opportunistic beamforming schemes the generation of the random orthonormal B matrix is independent from the channel information, so that regardless of the CSIT quality, no processing at the transmitter can be robustly designed and thus matrix B cannot be robustly designed. Also from the opportunistic policy, the users are only selected on the basis of the SNIR measures that they feed back to the base station for each one of the M generated beams, so that robust selection for multibeam schemes can neither be realized if all the users share the same uncertainty in their measurements, which is the most frequent case in commercial systems as all users employ the same receiver specifications and cope with the same length of the training process.

Therefore, the only tool that remains for the transmitter 1 in partial CSIT scenarios to deliver a robust transmission scheme, is the power loading over the M generated beams to meet some predefined minimum rate requirements. Thus, once the M users are selected, the power loading takes into consideration that the SNIR measures reflecting the actual channel quality for each selected user are imperfect. Therefore, the power loading (carried out at the power loading unit 4 of FIG. 1) has to consider the worst case scenario to guarantee that the QoS requirements are always met, while the minimum transmitted power is realized.

By reconsidering the SNIR formulation when the measurements are imperfect, the SNIR of former formula (4) reformulates as $$SNIR_{i,m} = \frac{p_m |c_{i,m} + \delta_{i,m}|^2}{\sigma^2 + \sum_{u \neq m}^{M} p_u |d_{i,u} + \delta_{i,u}|^2} \quad (8)$$

wherein $\delta_{i,m}$ denotes the error in the equivalent channel estimation for each transmitted beam, where the error is assumed to be an unknown value with a maximum power uncertainty value $\epsilon$. The estimation process is independent for each transmitted beam, so that $\delta_{i,m} \neq \delta_{i,n}$ for $m \neq n$.

The $SNIR_{i,m}$ depends on both the power loading and on the level of uncertainty in the received power from each transmitted beam, in contrast to the perfect CSIT case in equation (5). Thus, by using the SNIR formulation in equation (8), the power allocation problem with QoS constraints under the imperfect CSIT case stands as $$\min_P Tr(P) \quad (9)$$

$$\text{s.t.} \quad p_m |c_{i,m} + \delta_{i,m}|^2 - snir_i^{th}\left[\sigma^2 + \sum_{u \neq m}^{m} p_u |d_{i,u} + \delta_{i,u}|^2\right] \geq 0$$

$$\forall i, m, \delta$$

to indicate that even if the measured SNIR values are imperfect, the transmitter 1 has to allocate power in such a way to satisfy the QoS restrictions whatever is the uncertainty (bounded by a maximum power $\epsilon$). Notice that each constraint in previous problem stands as a hyperplane which always defines a convex set. Then, as the previous minimization has to be accomplished over all users and all kinds of uncertainty within the maximum power $\epsilon$, the intersection over a set of hyperplanes is also a convex set, allowing the power minimization to be formulated as a convex optimization problem.

As the system is restricted not only by the equivalent channel (HB) realization and the $snir^{th}$ requirements, but also by the level of uncertainty in the power measurements, then a feasibility region $S^P_\delta$ is obtained as $$S^P_\epsilon(HB, snir_i^{th}, \delta) = \quad (10)$$

$$\left\{ P \in \Omega \mid p_m |c_{i,m} + \delta_{i,m}|^2 - snir_i^{th}\left[\sigma^2 + \sum_{u \neq m}^{M} p_u |d_{i,u} + \delta_{i,u}|^2\right] \geq 0 \; \forall i, m, \delta \right\}$$

where $\delta$ denotes all the uncertainty components in the SNIR value. The power allocation has to be performed for all cases of uncertainty, so that a worst case calculation is needed to guarantee the QoS fulfilment in equation (9). If the user delivers an SNIR estimated value lower than its actual channel SNIR, then the transmitter 1 allocates more power to that user to satisfy its QoS, thus incurring in higher transmitted power and higher interference components, although ensuring the minimum rate to be satisfied. On the other hand, if the user reports an SNIR value that is higher than its actual channel SNIR, then the transmitter allocates less power than required and the QoS is not met. The worst case for QoS fulfilment is thus defined by the situation where the power estimation for each one of the transmitted beams, results in an estimated SNIR value higher than the actual SNIR value.

Inspecting the SNIR formulation in equation (8) and realizing that there exist M sources of uncertainty, then a higher SNIR value is obtained if the uncertainty in $|c_{i,m} + \delta_{i,m}|$ makes the numerator to increase or if any uncertainty in the interference components $|d_{i,u} + \delta_{i,u}|$ makes the denominator to decrease. Obviously, the worst case scenario relates to both simultaneous conditions. Considering the numerator case, the highest value is obtained if the uncertainty aligns with the equivalent channel $c_{i,m}$ obtaining an expression $$|c_{i,m} + \delta_{i,m}| = |c_{i,m}| + |\delta_{i,m}| = |c_{i,m}| + \sqrt{\epsilon}$$

and using the same procedure for the denominator, the worst case SNIR expression $SNIR^{wc}$ stands as $$SNIR_{i,m}^{wc} = \frac{p_m(|c_{i,m}| + \sqrt{\epsilon})^2}{\sigma^2 + \sum_{u \neq m}^{M} p_u(|d_{i,u}| - \sqrt{\epsilon})^2} \quad (11)$$

so that the power allocation problem restates for the worst case scenario as $$\min_P Tr(P) \quad (12)$$

$$\text{s.t.} \quad p_m(|c_{i,m}| + \sqrt{\epsilon})^2 - snir_i^{th}\left[\sigma^2 + \sum_{u \neq m}^{M} p_u(|d_{i,u}| - \sqrt{\epsilon})^2\right] \geq 0$$

$$\forall i, m$$

where this problem is numerically solved by any convex optimization tool as the ones in the book of "Convex Optimization", S. Boyd and L. Vandenberghe, Cambridge University Press, 2004. The previous expression guarantees the SNIR minimum $snir^{th}$ for all the scheduled users, whatever is the effect of the uncertainty in the measurements for each transmitted beam (as long as the uncertainty remains within a maximum power $\epsilon$) and within a partial feedback scheme.

Figure 3:
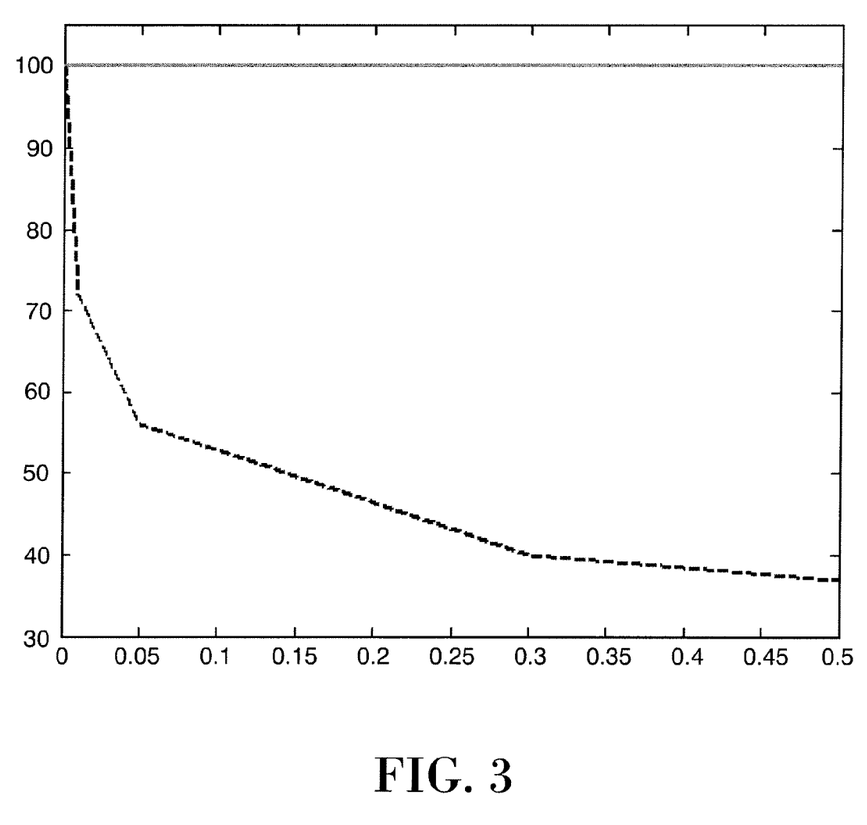
FIG. 3 shows a graphical representation of the QoS fulfillment according to an embodiment of the present invention.

FIG. 3 shows a graphical representation of the QoS (%) fulfilled by the above mentioned method of the invention in comparison to a non-robust method. This simulation takes into account uncertainty in the CSIT measures. As can be seen, the robust power allocation scheme ensures the 100% QoS for all the serviced users, while the non-robust one degrades with the deterioration of the uncertainty level, as a higher uncertainty induces a lower percentage of the QoS hits. A wireless scenario with $M=n_t=4$ transmitting antennas in a cell with 12 active users (N=12) is considered, each one equipped with a single receiving antenna. The transmitter runs a multibeam opportunistic beamforming technique where a total of M=4 orthogonal beams are set up. The simulation was carried out with the following values: noise power=0 dB; bandwidth=1 MHz; QoS minimum rate=140 Kbps. In FIG. 3 the percentage of QoS fulfilment is represented as a function of the uncertainty level (from 0 to 0.5 W). The solid line represents the percentage of QoS fulfilment in a robust power allocation according to the current embodiment of the invention, while the dotted line represents the percentage of QoS fulfilment of a prior art non-robust scheme.

B—Robust Probability of Outage Design (Statistical Design)

In this section, an alternative method of robust power allocation is proposed, where the SNIR distribution is used for the power allocation process instead of the SNIR instantaneous measures.

In the worst case scenario just presented, the probability that the uncertainty causes an increase in the numerator at the same time as each one of the interference components decreases, is relatively low. Therefore, the formulation in (12) is very pessimistic in many situations, as guarantees a minimum rate for absolutely all cases.

Furthermore, the wireless operators have realized that some users can provide deficient channel conditions for communication, thus delivering service to such users can be very expensive in terms of system resources. The whole system performance is then droven down. Therefore, if these users are dropped, the operator can offer better service to all the remaining ones in the system. Based on this practical point of view, operators can be more interested in probability of outage measures rather than on absolute QoS fulfillment, making all the commercial systems to fix a target probability of outage $\xi_{out}$ in the users QoS.

By considering a probability of outage in the users QoS service, an alternative robust power allocation method is presented, that contemplates the average distribution of the serving SNIR for each selected user. Based on the opportunistic policy to deliver service to the users, the serving SNIR value corresponds to the maximum SNIR over the active users in the system, so that the calculation of the distribution of the serving SNIR enables a power loading that is not performed over the instantaneous SNIR fed back measures, but over the distribution of the serving SNIR.

This makes the power loading to be unaffected by the uncertainty in the SNIR values, and restricts the relevance of the SNIR feedback to the user selection process and not as a channel quality indicator.

For easiness in the notation, a common restriction to the minimum SNIR per user ($snir^{th}$) is assumed. Thus, the power loading formulation with a target probability of outage in the QoS states as follows:

$$\min_{P} Tr(P) \quad (13)$$

$$\text{subject\_to: } Prob\{SNIR(P) - snir^{th} \leq 0\} \leq \xi_{out}$$

where the cumulative distribution function (cdf) of the maximum SNIR is needed for the calculation of the required power in the previous formulation.

If it is considered that all the scheduled users present the same distribution of the maximum SNIR value, a uniform power distribution p is applied over all the transmitted beams. The numerator of the SNIR equation in (4) follows a Chi-square of 2 degrees of freedom $\chi^2(2)$ distribution while the interference terms in the denominator are modeled as a Chi-square of 2(M−1) degrees of freedom $\chi^2(2(M-1))$, which allows to obtain the probability distribution function (pdf) as:

$$f(x) = \frac{e^{-x\sigma^2/p}}{(1+x)^M} \left( \frac{\sigma^2}{p}(1+x) + M - 1 \right) \quad (14)$$

and the cdf is formulated as $$F(x) = 1 - \frac{e^{-x\sigma^2/p}}{(1+x)^{M-1}} \quad (15)$$

Since the serving SNIR is the maximization over all the users' SNIR values, then the maximum SNIR cdf is stated as:

$$FF(x) = (F(x))^N = \left[ 1 - \frac{e^{-x\sigma^2/p}}{(1+x)^{M-1}} \right]^N \quad (16)$$

which enables the restriction of outage probability in equation (13) to be represented by the cdf($snir^{th}$) as follows:

$$\min_{P} Tr(P) \quad (17)$$

$$\text{subject\_to: } \left[ 1 - \frac{e^{-snir^{th}\sigma^2/p}}{(1+snir^{th})^{M-1}} \right]^N \leq \xi_{out}$$

where the relationship between the transmitted power and both the $\xi_{out}$ and $snir^{th}$ restrictions is established to provide the minimum required power to satisfy the QoS restrictions as:

$$p \geq \frac{snir^{th}\sigma^2}{\ln\left( \left(1 - \sqrt[N]{\xi_{out}}\right)(1+snir^{th})^{M-1} \right)^{-1}} \quad (18)$$

As already stated, this formulation is not affected by the SNIR uncertainty in the power allocation procedure, while the SNIR measures are still used for the user selection process, but this has a negligible effect in changing the distribution of the serving SNIR if the uncertainty region is common for all the users. An interesting property of this scheme when compared to the worst case approach is that the wireless operator does not need to care about the measures uncertainty, so that the knowledge of the uncertainty region value is not required, which reduces the system setups prior to transmission.

On the other hand, the worst case approach provides a higher benefit of the multiuser gain, as it makes the power loading on the basis of the instantaneous SNIR values, while for the probability of outage approach, the power allocation is based on the serving SNIR average distribution, thus not fully exploiting the instantaneous SNIR measures. Nevertheless, the multiuser gain is presented in terms of the user selection process, and as reflected by the exponent of expression (16), also in the distribution of the serving SNIR.

Figure 4:
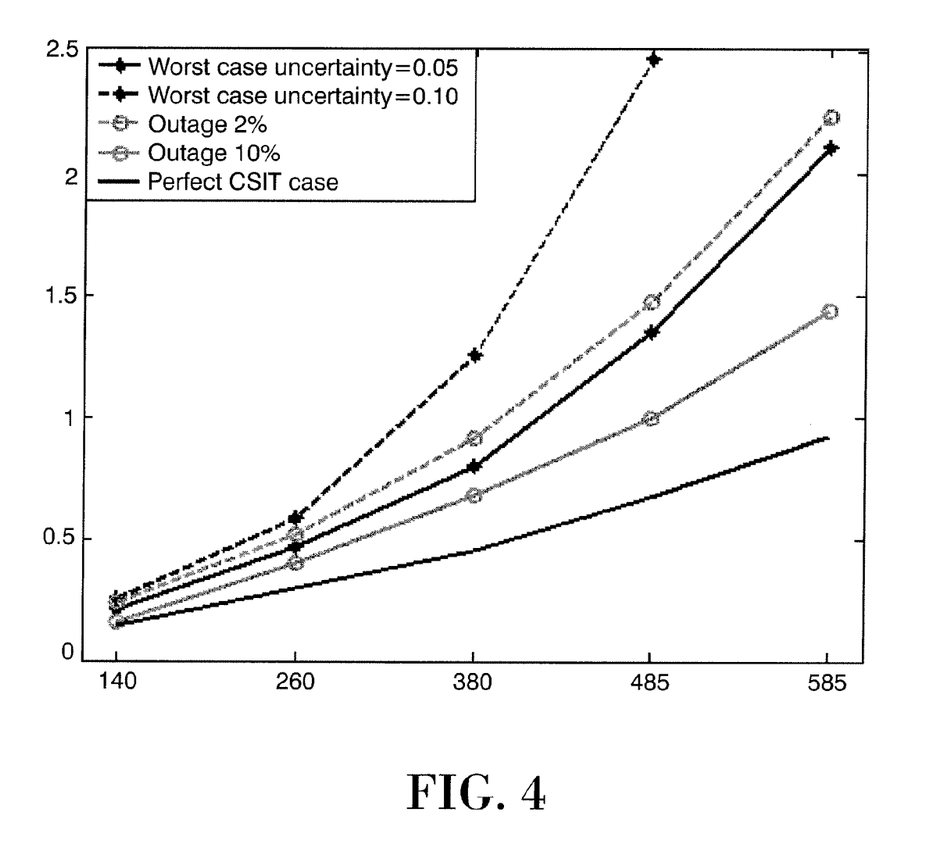
FIG. 4 shows the quality-of-service performance comparison of the power allocation schemes in the present invention.

A comparison between the worst case design (A) and the statistical design (B) is shown in FIG. 4, which shows the total required power (in Watts) as a function of the minimum rate (kbps). As the statistical design is controlled by the outage $\xi_{out}$, two different outages are shown (2% and 10%). On the other hand, as the worst case design is highly affected by the maximum uncertainty E values, two uncertainties are also considered (0.05 and 0.10). Although both approaches do not share the same restrictions nor performance, they deliver the operator the freedom to choose among them for the best matching with its specifications. The performance with perfect CSIT in equation (6) is also shown in the figure, standing as the performance upper bound when no outage nor uncertainties are present.

Simulations and Results

The performance of the proposed schemes is presented by Monte Carlo simulations, where the objective is to decrease the transmitted power while ensuring the QoS restrictions in terms of minimum SNIR per served user, regardless of the system sum rate. A wireless scenario with $M=n_t=4$ transmitting antennas in a cell with 30 active users is considered, each one equipped with a single receiving antenna. The transmitter runs a multibeam opportunistic beamforming technique where a total of M=4 orthogonal beams are set up. A noise variance $\sigma^2=0$ dB is assumed together with a system bandwidth=1 MHz. For ease in the notation, the scheme according to the robust worst case method is denoted as robust scheme (A), while the scheme according to the robust probability of outage method is presented as robust scheme (B).

Figure 5:
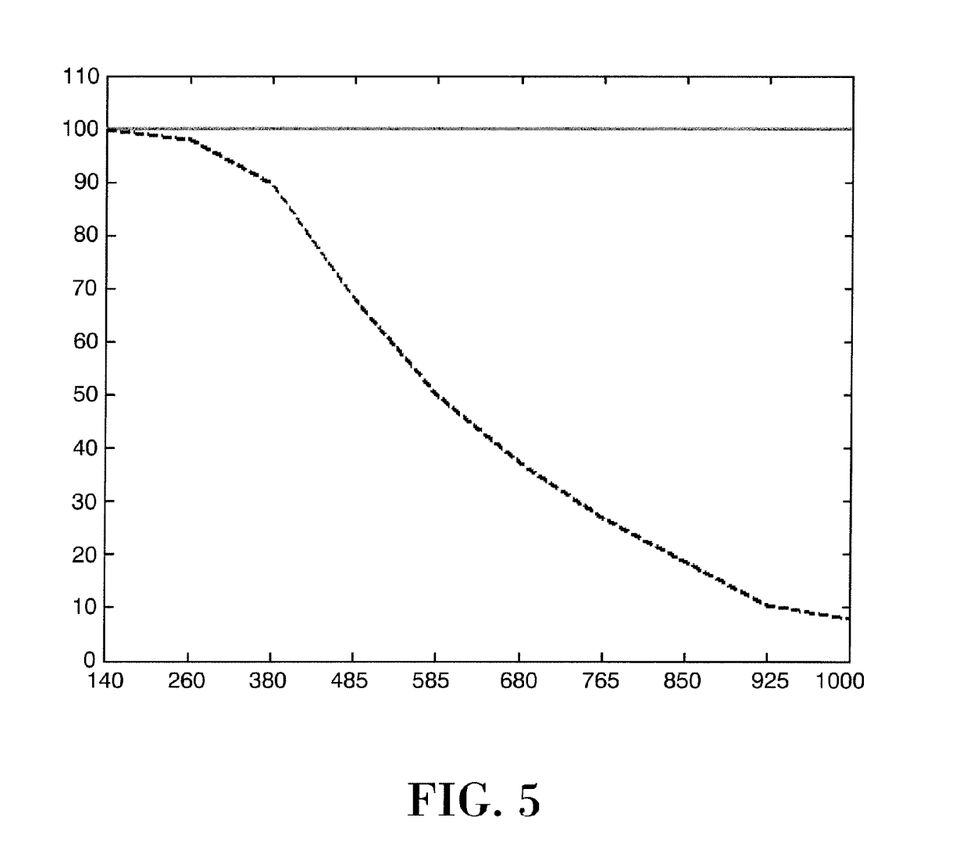
FIG. 5 shows the performance of a robust scheme according to an embodiment of the invention in comparison to a non-robust scheme.

In a first approach, the performance of the opportunistic scheme in a perfect CSIT scenario with QoS restrictions (refer to equation (6)), is compared to the standard scheme with a sum rate objective (refer to equation (3)), both operated under same total power for a fair comparison. FIG. 5 shows how the QoS technique of the invention achieves 100% QoS requirements (solid line), while the standard scheme offers a variable QoS fulfillment percentage based on the user SNIR constraint (dotted line). The QoS fulfilment is represented as a function of the required minimum rate (kbps). This is an important aspect for commercial implementation of the opportunistic schemes as a minimum rate is needed to be guaranteed for each served user. N=30 active users is considered.

Figure 6:
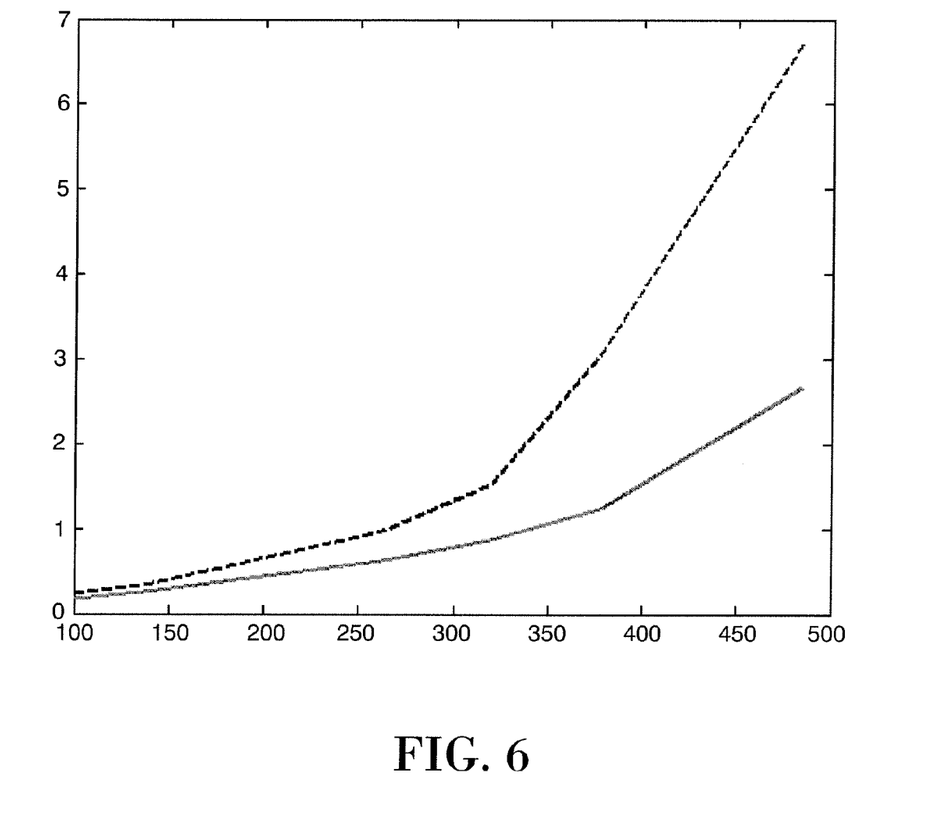
FIGS. 6 and 7 show the performance of a first robust scheme according to another embodiment of the invention.

In FIG. 6 the performance of the robust-A proposed scheme with a worst case scenario study is presented, where an environment with a variable required minimum rate (kbps) is shown (with a common rate to all the users). It plots the performance for two numbers of active users in the cell (dotted line N=10 active users; solid line N=30 users), where an uncertainty value $\epsilon=0.1$ is considered. The QoS hit is 100% for all cases. Observe that as the required minimum rate increases, then more power is needed to satisfy such requirements. Also note that an increase in the number of active users improves the probability to find users with better channel characteristics, so that the fulfilment of the QoS minimum rate requirements is less power consuming. Certainly, this fact also exhibits the multiuser gain of the opportunistic schemes in terms of lower required transmitting power. The non-robust scheme is not included in the comparison as it does not guarantee the QoS for an uncertainty value of $\epsilon=0.1$.

Figure 7:
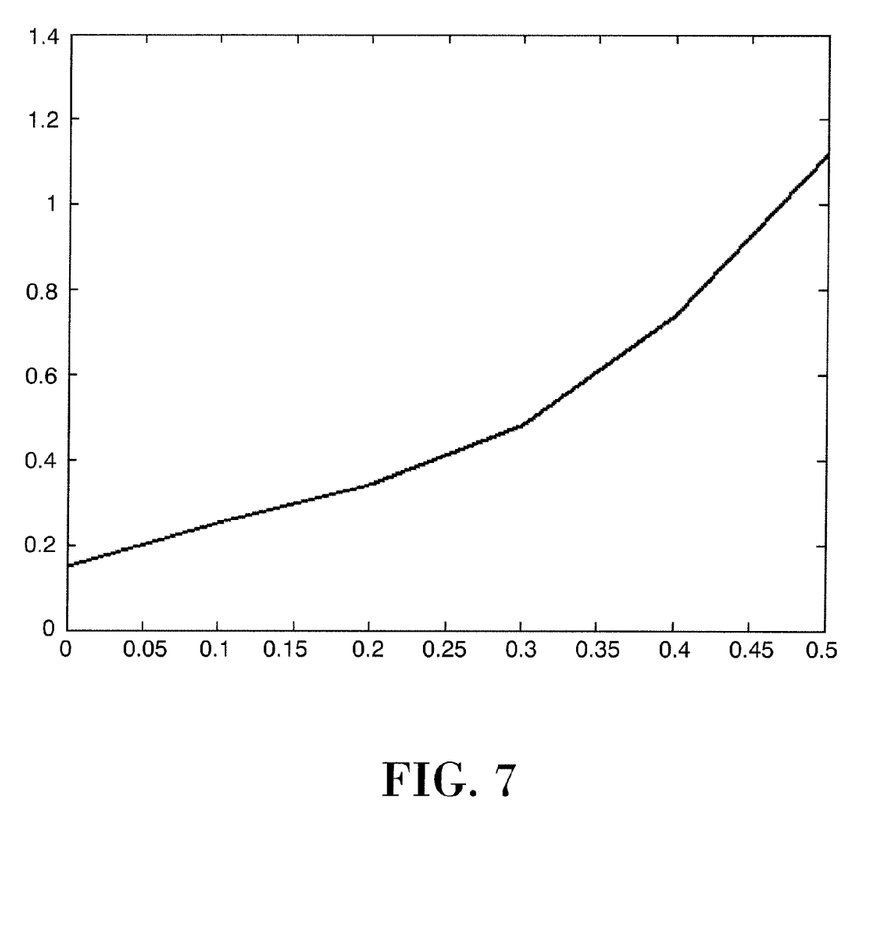

The robust-A scheme is targeted to ensure the QoS fulfilment for any uncertainty region at the expenses of higher required power. FIG. 7 fixes a minimum rate of 140 kbps and shows the performance (required total power) of robust-A scheme in an environment with varying uncertainty value s (from 0 to 0.5), where an increasing power is required to guarantee the QoS requirements (QoS hit=100% for all cases) as the uncertainty level is increased.

Figure 8:
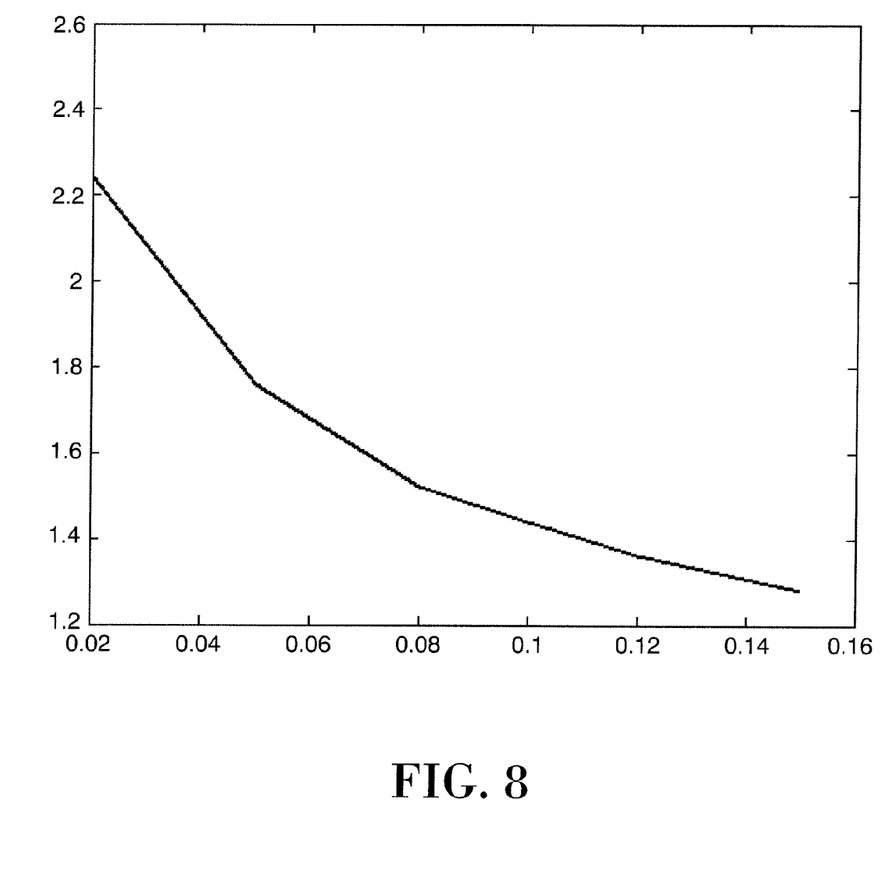
FIG. 8 shows the performance of a second robust scheme according to another embodiment of the invention.

Finally, the behaviour of the robust-B power allocation scheme through the outage probability is presented in FIG. 8, where a required minimum rate of 500 kbps is used in a commercial system with a variable probability of outage $\xi_{out}$ value. The total power is represented as a function of the maximum allowed outage probability (from 0.02 to 0.15), with N=30. It is shown how a higher allowed $\xi_{out}$ value gives more freedom to the scheduler in the resource allocation procedure, so that the worst channel users can be discarded with the consequent saving in the power budget as plotted in FIG. 8.

In summary, the current invention presents a power allocation scheme that uses the minimum power to guarantee the QoS minimum rate for each one of the scheduled users, where a partial CSIT scenario is considered with only the channel modulo information being available at the scheduler. This translates into a 50% feedback reduction as compared to full CSIT, which enables a practical implementation of the Multiuser MIMO techniques in commercial systems.

As a realistic consideration of commercial transmission schemes, this invention presents a power allocation scheme that is robust to any uncertainty in the CSIT information, where a system that operates with partial and imperfect CSIT is a very attractive option in commercial wireless systems.

A first embodiment that considers the worst case scenario for the power loading procedure is proposed when hard QoS restrictions are required by the system administrator for all served users.

A second embodiment that provides outage measures in the resource allocation is presented, where the serving SNIR distribution is considered for the power loading.

The performance of both schemes is shown through simulations where the benefits of each scheme are highlighted. As both robust transmission schemes do not share the same objectives and requirements, a complete comparison between the two proposed schemes is not possible as the outage scheme provides lower QoS fulfillment than the worst case scheme while the outage scheme works regardless of the uncertainty level. Therefore, it cannot be declared that one of the embodiments is better than the other one. Rather, both schemes are proposed to provide the wireless operator with the freedom to choose the best strategy based on its available resources and demanded restrictions.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. Method for allocating a minimum downlink power from a transmitter (1) of a cellular multi-user multi-antenna communications system with N users (30-1, 30-2, . . . , 30-N) attached to said transmitter (1), wherein the transmitter (1) comprises $n_t$ transmit antennas (10-1, 10-2, . . . , 10-$n_t$), and each of the N users comprises at least one antenna (30-1$_1$ . . . , 30-1$_{Z1}$, 30-2$_1$ . . . , 30-2$_{Z2}$, . . . 30-N$_1$ . . . , 30-N$_{ZN}$), the method comprising the steps of, at a certain time instant t:

generating at said transmitter (1) a plurality of M random beams (b$_1$ . . . b$_M$), wherein $2 \leq M \leq n_t$;

sending each one of said M random beams through all the said $n_t$ transmit antennas (10-1, 10-2, . . . , 10-$n_t$);

calculating at each one of said N users (30-1, 30-2, . . . , 30-N) a signal-to-noise-interference-ratio for each one of said M random beams sent by said transmitter (1);

sending back to said transmitter (1) said calculated values of signal-to-noise-interference-ratio, said signal-to-noise-interference-ratio representing a partial channel state information;

selecting at said transmitter (1) the M best users which correspond to the M best values of signal-to-noise-interference-ratio per beam;

assuming at the transmitter (1) that there exists uncertainty in said partial channel state information;

characterised in that the method further comprises the steps of:

allocating a minimum amount of power to said M beams (b$_1$ . . . b$_M$), wherein said minimum amount of power is dependent on said best values of signal-to-noise-interference-ratio per beam (b$_1$ . . . b$_M$), on a predetermined quality of service requirement per user (30-1, 30-2, . . . , 30-N) and on a predefined allowed outage in the quality of service requirement per user, said power allocation being robust to said assumed uncertainty in said partial channel state information.

2. Method according to claim 1, wherein said selection of best values of signal-to-noise-interference-ratio is performed over the instantaneous signal-to-noise- interference-ratio fed back measures.

3. Method according to claim 1, wherein said predefined allowed outage in the quality of service requirement per user is zero and, due to said uncertainty in the partial channel state information at the transmitter (1), a worst case scenario is chosen in order to guarantee the fulfilment of said quality of service requirement while allocating the minimum amount of power.

4. Method according to claim 3, wherein the M values of allocated power which minimize the total transmitted power from the transmitter (1) are obtained by solving the following convex optimization problem:

$$\min_{P} Tr(P)$$

$$\text{s.t.} \quad p_m(|c_{i,m}| + \sqrt{\varepsilon})^2 - snir_i^{th}\left[\sigma^2 + \sum_{u \neq m}^{M} p_u(|d_{i,u}| - \sqrt{\varepsilon})^2\right] \geq 0$$

$$\forall i, m$$

wherein:
P is a diagonal M×M matrix, each of its elements $p_m$ representing the power allocated to each transmit beam, wherein $2 \leq m \leq M$;
$c_{i,m}$ is the equivalent channel seen by each $i^{th}$ user with respect to the $m^{th}$ transmit beam;
$\varepsilon$ is a maximum power within which the uncertainty remains;
$snir_i^{th}$ is the minimum restricted SNIR per $i^{th}$ user;
$\sigma^2$ is the noise variance;
$d_{i,u}$ is the equivalent channel seen by each $i^{th}$ user with respect to the $u^{th}$ transmit beam.

5. Method according to claim 1, wherein said predefined allowed outage in the quality of service requirement per user is greater than zero.

6. Method according to claim 5, wherein due to said uncertainty in the partial channel state information at the transmitter (1), a statistical scenario is chosen in order to guarantee the fulfilment of said quality of service requirement while allocating the minimum amount of power.

7. Method according to claim 6, wherein allocated power which minimizes the total transmitted power from the transmitter (1) follows a uniform power distribution applicable to all transmit beams.

8. Method according to claim 7, wherein said uniform power distribution takes the following form:

$$p \geq \frac{snir^{th}\sigma^2}{\ln\left(\left(1 - \sqrt[N]{\xi_{out}}\right)(1 + snir^{th})^{M-1}\right)^{-1}}$$

wherein:
$snir^{th}$ is the minimum restricted SNIR per user;
$\sigma^2$ is the noise variance;
$\xi_{out}$ is a target probability of outage in the users' quality of service.

9. Method according to claim 5, wherein due to said uncertainty in the partial channel state information at the transmitter (1), a scheme based on the probability of outage in the users' quality of service is followed in order to guarantee the fulfilment of said quality of service requirement per user while allocating the minimum amount of power.

10. Method according to claim 1, further comprising the step of transmitting from said transmitter (1) said allocated power to said selected M users through said $n_t$ transmit antennas (10-1, 10-2, . . . , 10-$n_t$).

11. Transmitter (1) comprising means adapted for carrying out the steps of the method according to claim 1.

12. Base station which comprises at least a transmitter (1) according to claim 11.

13. Mobile communications system which comprises at least a base station according to claim 12.

14. A computer program comprising computer program code means adapted to perform the steps of the method according to claim 1 when said program is run on a computer, a digital signal processor, a field-programmable gate array, an application-specific integrated circuit, a micro-processor, a micro-controller, or any other form of programmable hardware.

* * * * *